(12) United States Patent
Lee

(10) Patent No.: US 11,829,402 B2
(45) Date of Patent: Nov. 28, 2023

(54) METHOD FOR PROVIDING CONTENT USING COMMUNICATION WITH ANIMALS AND PROGRAM AND SYSTEM THEREFOR

(71) Applicant: Jong Hwa Lee, Yangju-si (KR)

(72) Inventor: Jong Hwa Lee, Yangju-si (KR)

( * ) Notice: Subject to any disclaimer, the term of this patent is extended or adjusted under 35 U.S.C. 154(b) by 97 days.

(21) Appl. No.: 17/567,755

(22) Filed: Jan. 3, 2022

(65) Prior Publication Data

US 2022/0207071 A1 Jun. 30, 2022

Related U.S. Application Data

(63) Continuation of application No. PCT/KR2020/008687, filed on Jul. 2, 2020.

(30) Foreign Application Priority Data

Jul. 2, 2019 (KR) .......... 10-2019-0079068
Jun. 30, 2020 (KR) .......... 10-2020-0080374

(51) Int. Cl.
*G06F 16/435* (2019.01)
*G06F 16/438* (2019.01)

(52) U.S. Cl.
CPC .......... *G06F 16/435* (2019.01); *G06F 16/438* (2019.01)

(58) Field of Classification Search
CPC .............................. G06F 16/435; G06F 16/438
USPC ...................................................... 707/722
See application file for complete search history.

(56) References Cited

U.S. PATENT DOCUMENTS

| 10,825,318 | B1 * | 11/2020 | Williams | G06N 3/08 |
| 2014/0149546 | A1 * | 5/2014 | Hong | A01K 29/005 |
| | | | | 709/217 |
| 2018/0268033 | A1 * | 9/2018 | Federspiel | H04N 21/4532 |

FOREIGN PATENT DOCUMENTS

| JP | H10-003479 A | 1/1998 |
| KR | 10-1108114 B1 | 1/2012 |
| KR | 10-1397572 B1 | 5/2014 |
| KR | 10-2016-0097492 A | 8/2016 |
| KR | 10-2018-0062049 A | 6/2018 |
| KR | 10-2019-0020513 A | 3/2019 |

OTHER PUBLICATIONS

International Search Report issued in PCT/KR2020/008687; dated Oct. 8, 2020.

* cited by examiner

*Primary Examiner* — Kimberly L Wilson
(74) *Attorney, Agent, or Firm* — Studebaker & Brackett PC

(57) ABSTRACT

The present disclosure relates to a method for providing content using communication with animals and the program and the system therefor, which can analyze information of a pet, such as the pet's action, noise, and surrounding environment, process the information into a message, provide a user with the message, search for content matching the message after analyzing the user's response message, and output and provide the contents for the pet.

11 Claims, 2 Drawing Sheets

METHOD FOR PROVIDING CONTENT USING COMMUNICATION WITH ANIMALS AND PROGRAM AND SYSTEM THEREFOR

CROSS-REFERENCE TO RELATED APPLICATION

The present application is a continuation of International Patent Application No. PCT/KR2020/008687, filed on Jul. 2, 2020, which is based upon and claims the benefit of priority to Korean Patent Application Nos. 10-2019-0079068, filed on Jul. 2, 2019 and 10-2020-0080374, filed on Jun. 30, 2020. The disclosures of the above-listed applications are hereby incorporated by reference herein in their entirety.

BACKGROUND

1. Technical Field

The present disclosure relates to a method for providing content using communication with animals and a program and a system therefor.

2. Description of Related Art

As interest in companion animals and pets increases, infrastructure relating to pet articles and pet hospitals is increasing every year. Especially, with an increase of one-person households, this trend is accelerating further.

However, because a person cannot be with a pet all the time, a pet which is left home alone may suffer and, in severe cases, may suffer from depression.

As a countermeasure, a pet owner may leave the house after turning on the TV for the pet, but it is provided by the pet owner one-sidedly, regardless of the pet's taste and desire.

Like people, pets may have desired videos or images according to tastes and desires, but technology for providing videos or images to pets considering pets' tastes and conditions is still not disclosed.

SUMMARY

The present disclosure has been made to solve the above-mentioned problems occurring in the prior art, and it is an object to provide a method for providing content using communication with animals and a program and a system therefor, which can analyze information of a pet, such as the pet's action, noise, and surrounding environment, process the information into a message, provide a user with the message, search for content matching the message after analyzing the user's response message, and output the contents to provide the contents for the pet.

To accomplish the above objects, there is provided a method for providing content using communication with animals including the operations of: collecting information on an animal with a collecting device; receiving the information with a receiving device; analyzing and processing the received information into a message with an analyzing device; first outputting the message with a first output device; analyzing a response message received by the first output device by the analyzing device; searching for content corresponding to the analysis of the response message of the analyzing device by a searching device; and second outputting the searched content by a second output device.

In another aspect of the present invention, there is provided a computer readable recording medium on which a program for performing the method the method for providing content using communication with animals is stored in combination with a computer that is hardware.

In a further aspect of the present invention, there is provided a system for providing content using communication with animals, the system including: a collecting device for collecting information on an animal; a server receiving the information from the collecting device; a first output device receiving a message corresponding to the information from the server, outputting the received message, and providing a response message; and a second output device outputting content corresponding to the response message, wherein the server includes: a receiving unit receiving the information from the collecting device; an analysis unit analyzing the information, processing the information into a message, providing the message to the first output device, and analyzing the response message received from the first output device; and a search unit searching for the content corresponding to the analysis of the response message.

DETAILED DESCRIPTION

Figure 1:
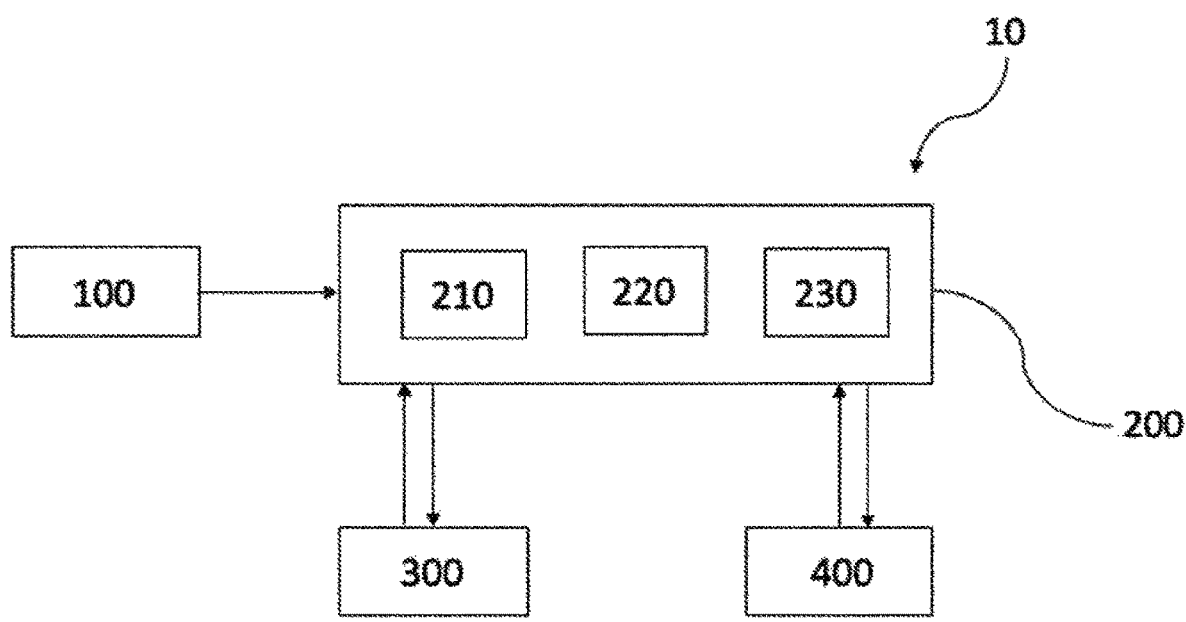
FIG. 1 is a block diagram of a system for providing contents using communication with animals according to an embodiment of the present invention.

Advantages and features of the present disclosure and methods accomplishing the advantages and features will become apparent from the following detailed description of exemplary embodiments with reference to the accompanying drawings. However, the present invention is not limited to exemplary embodiment disclosed herein but will be implemented in various forms. The exemplary embodiments are provided so that the present invention is completely disclosed, and a person of ordinary skilled in the art can fully understand the scope of the present invention.

Terms used in the specification are used to describe specific embodiments of the present disclosure and are not intended to limit the scope of the present disclosure. In the specification, the terms of a singular form may include plural forms unless otherwise specified. It should be also understood that the terms of 'include' or 'have' in the specification are used to mean that there is no intent to exclude existence or addition of other components besides components described in the specification. In the detailed description, the same reference numbers of the drawings refer to the same or equivalent parts of the present invention, and the term "and/or" is understood to include a combination of one or more of components described above. It will be understood that terms, such as "first" or "second" may be used in the specification to describe various components but are not restricted to the above terms. The terms may be used to discriminate one component from another component. Therefore, of course, the first component may be named as the second component within the scope of the present invention.

In this specification, a computer includes various devices capable of visually presenting results to a user through operational management. For instance, the computer may be one selected from desktop PCs, notebooks, smart phones, tablet PCs, cellular phones, personal communication service phones (PCS phones), mobile terminals of synchronous/asynchronous international mobile telecommunication-2000 (IMT-2000), palm personal computers, personal digital assistants (PDAs), and the likes. Moreover, the computer may be a server computer connected with various client computers.

Unless otherwise defined, all terms (including technical and scientific terms) used herein have the same meaning as commonly understood by those skilled in the technical field to which the present disclosure pertains. It will be further understood that terms, such as those defined in commonly used dictionaries, should not be interpreted in an idealized or overly formal sense unless expressly so defined herein.

Hereinafter, a method for providing content using communication with animals and a program and a system therefor according to an embodiment of the present invention will be described in detail with reference to the accompanying drawings.

In the method for providing content using communication with animals and the program and the system therefor according to an embodiment of the present invention, animals may mean pets. In the method for providing content using communication with animals and the program and the system therefor according to an embodiment of the present invention, animals may mean companion animals. For instance, the companion animal may mean a companion dog.

FIG. 1 is a block diagram of a system for providing contents using communication with animals according to an embodiment of the present invention.

Referring to FIG. 1, a content providing system according to an embodiment of the present invention includes a collecting device 100, a server 200, a first output device 300, and a second output device 400.

The collecting device 100 collects information on an animal. The information on the animal can include the animal's type, the animal's action, the animal's noises, and the animal's surrounding environment. The animal's action means the animal's present action. The animal's surrounding environment can include whether the animal is indoors or outdoors, and objects around the animal.

The collecting device 100 may be, for example, a camera. In an embodiment, the collecting device 100 may be integrated with the first output device 300. In another embodiment, the collecting device 100 may be integrated with the second output device 400.

For instance, the collecting device 100 may be at least one among an image collecting device, such as a camera, and a sound collecting device, such as a microphone, which are installed/disposed in a location in which the animal is located, for example, in the user's house or outdoors.

The collecting device 100 is installed in a location suitable for capturing images of the animal in a house, namely, a location in which the animal usually stays, to collect information on the animal's actions and noises.

The server 200 receives information on the animal from the collecting device 100. The server 200 provides a service application applicable to the present disclosure, and the user can use services of the present disclosure by installing and operating the service application in the first output device 300 and the second output device 400. However, the present disclosure is not limited to the above, and any application which can send a message to the user and receive a response message from the user, namely, which can send SMS messages to the first output device 300 and receive a response SMS message from the user, is possible to be applied to the present disclosure.

The server 200 includes a receiving unit 210, an analysis unit 220, and a search unit 230. Hereinafter, the receiving unit 210, the analysis unit 220, and the search unit 230 are illustrated individually, but at least two of the receiving unit 210, the analysis unit 220, and the search unit 230 may be united. For instance, the receiving unit 210 and the analysis unit 220 can be united into one unit.

The receiving unit 210 receives information from the collecting device 100.

The analysis unit 220 analyzes the information, processes the information into a message, and provides the message to the first output device 300.

The analysis unit 220 analyzes a response message received from the first output device 300. The analysis unit 220 grasps the user's intention by analyzing the response message received from the first output device 300.

For instance, the analysis unit 220 can use a method of extracting a plurality of keywords to search for content by analyzing the response message.

In an embodiment, the analysis unit 220 can analyze information on the animal, and learn through deep learning to output the message corresponding to the information. When the information on the animal includes the animal's type, the animal's action, the animal's noises, and the animal's surrounding environment, the analysis unit 220 can learn each of the animal's type, the animal's action, the animal's noises, and the animal's surrounding environment individually through deep learning, and output messages corresponding to the animal's type, the animal's action, the animal's noises, and the animal's surrounding environment. The animal's type, action, noise, and surrounding environment can be respectively learned through different deep learning models, and it is not limited to the above.

For instance, the analysis unit 220 is deeply learned to analyze noises and actions of the animal, for instance a dog, and to predict what the dog wants, and analyzes information received from the collecting device 100 using such an artificial intelligence (AI) algorithm and processes the analyzed information into a message.

The analysis unit 220 can analyze a response message through the deep learning model. The "response message" means the user's response to the message provided to the first output device 300.

Hereinafter, the deep learning model will be described with an example.

The analysis unit 220 of the server 200 has at least one computer to form the deep learning model, and serves to analyze a message corresponding to the information on the animal or the response message.

The deep learning model according to an embodiment of the present invention means a system or a network which carries out judgement based on a number of data by establishing at least one layer on at least one computer. For example, the deep learning model may be embodied by a set of layers including a convolutional pooling layer, a locally-connected layer, and a fully-connected layer. The convolutional pooling layer or the locally-connected layer is formed to extract features of an image. The fully-connected layer can determine correlation between the features of the image. In an embodiment, the entire structure of the deep learning model can be formed in such a manner that the locally-connected layer is connected to the convolutional pooling layer and the fully-connected layer is connected to the locally-connected layer. The deep learning model can include various judgment standards, namely, parameters, and can have new judgment standards (parameters) added through analysis of input images.

The deep learning model according to the embodiments of the present invention has a convolutional neural network suitable for image analysis, and can have a structure that a feature extraction layer, which learns a feature with the most discriminative power from the given image data, and a prediction layer, which learns a prediction model for providing the highest prediction performance based on the extracted feature are integrated.

The feature extraction layer is a structure to repeat a convolution layer for building a feature map by applying a plurality of filters to each area and a pooling layer for extracting unchangeable features regardless of changes in location or rotation by spatially uniting the feature map several times by turns. Through the above, the feature extraction layer can extract features of various levels ranging from low-level features, such as dots, lines, and sides, to complicated and meaningful high-level features.

The convolution layer obtains a feature map by taking a non-linear activation function in the inner area of the filter and the local receptive field for each patch of the input image. Compared to other network structures, a CNN uses a filter having a sparse connectivity and shared weights. Such a connection structure reduces the number of parameters to be learned and efficiently produces learning through a reverse propagation algorithm, thereby improving prediction performance.

A pooling layer or a sub-sampling layer generates a new feature map by utilizing regional information of the feature map obtained from the previous convolution layer. In general, the feature map newly created by the pooling layer is reduced to a size smaller than the original feature map. A representative pooling method includes a maximum pooling for selecting the maximum value of a corresponding area in the feature map, and an average pooling for obtaining an average value of the corresponding area in the feature map. In general, the feature map of the pooling layer is less affected by the position of any structure or pattern existing in the input image than the feature map of the previous layer. That is, the pooling layer can extract features stronger than local changes, such as noise or distortion, in the input image or the previous feature map, and this feature can serve an important role in classification performance. Another role of the pooling layer allows features of a wider area to be reflected as ascending to the upper learning layer in the deep structure. While the feature extraction layers are accumulated, features are created to reflect local features at the lower layers and to reflect abstract characteristics of the entire image.

As described above, the feature finally extracted through the repetition of the convolution layer and the pooling layer can be used for classification model learning and prediction by combining a classification model, such as a multi-layer perception (MLP) network or a support vector machine (SVM) in the form of a Fully-connected layer.

However, the structure of the deep learning model according to the embodiments of the present invention is not limited thereto, and can be formed as a neural network having various structures.

According to an embodiment of the present invention, the analysis unit 220 can analyze the information on the animal, and learn through a reinforcement learning model to output a message corresponding to the information. The analysis unit 220 can learn the animal's type, the animal's action, the animal's noises, and the animal's surrounding environment through one reinforcement learning model, but the present invention is not limited thereto.

The analyzing device 200 can analyze the response message through the reinforcement learning model.

Hereinafter, the reinforcement learning model will be described for example.

The reinforcement learning model is a model that learns what action is optimal in a current State. Whenever the animal takes an action, a reward is given from the external environment, where learning is performed in a direction that maximizes the reward. The reward may be a delayed reward that is not given as soon as the action is taken.

The reinforcement learning model selects an action such that the total sum of the reward values, including values obtained later, is maximized even if the immediate reward value is small. In consideration of the future, the reinforcement learning model searches and selects the current action while considering what is the best choice on the basis of the learning so far in consideration of actions capable of being carried out in various manners.

For example, in the content providing system using communication with animals according to an embodiment of the present invention, the state can be information on an animal, and the action can be a message.

For instance, in the content providing system using communication with animals according to an embodiment of the present invention, the state can be a response message, and the action can be creation of a keyword searching for images or movies.

The search unit 230 searches for content corresponding to the analysis of the response message.

The search unit 230 searches for images or videos corresponding to the response message on the Internet. In this instance, the search unit 230 may search whether or not there is matching contents in the images or videos stored in a database in the server 200, and also search whether or not there is matching contents on the Internet.

The Internet search of the search unit 230 can be implemented in such a manner as to search a moving picture platform, such as YouTube.

The YouTube search only illustrates a representative moving picture platform at the present time, and any ways to search for videos and images by searching on the Internet can be applied.

The first output device 300 receives and outputs a message from the server 200. The first output device 300 can receive a message including advertisement from the server 200 and output the message.

The first output device 300 can transfer a message to the user.

The first output device 300 can output an image or an audio recording. For instance, the image may be a text or an image. The audio recording may be an animal's noises or a person's voice.

In an embodiment, the first output device 300 may be a user's smart device. In an embodiment, the first output device 300 may be a wearable device that the animal wears. For instance, the first output device 300 may be a smart speaker attached to a leash of the animal.

When a message is output from the first output device 300, the user can provide a response message. The response message may be an image or an audio recording. The user can directly input the response message to the first output device 300 or can respond in voice.

The first output device 300 can provide the response message to the server 200. The first output device 300 can provide the response message to the analysis unit 220.

The first output device 300 can be united with the second output device 400. However, the present invention is not limited thereto, and the first output device 300 may be a device separated from the second output device 400.

The second output device 400 can output contents corresponding to the response message. The contents can include images or videos. The second output device 400 can provide the animal with images or videos.

The second output device 400 may be a display device. The second output device 400 can be installed at a place where the animal can watch the output contents.

Hereinafter, an example that communication is carried out through the contents providing system using communication with animals according to an embodiment of the present invention will be described.

The collecting device 100 collects information on the animal, and provides the information to the receiving unit 210 of the server 200. The analysis unit 220 of the server 200 analyzes the information on the animal, and outputs a message, "I want a video showing food being eaten," to the first output device 300. In the case that advertisement is included, the analysis unit 220 can make the first output device 300 output a message, "I want to see a video in which an animal is eating feedstuffs of A company." The user can input a message, "Show a video in which an animal is eating feedstuffs," as a response message, and the analysis unit 220 creates a search keyword. Based on the above, the search unit 230 can search for proper content. The searched video or image can be output by the second output device 400.

The analysis unit 220 can analyze the collected information while/after the animal watches the video, for example, information on the animal's actions or noises, and generate reaction information of the animal with respect to the video. In addition, the analysis unit 220 can process a message using the animal reaction information, and provide the processed message to the first output device 300.

For example, if the animal's response to the video or image provided through the second output device 400 as a result of the analysis of the analysis unit 220 was not good, the analysis unit 220 can create a message, "This video is not fun," and provide the message to the first output device 300. In the case that advertisement is included, the analysis unit 220 can create a message, "This video is not fun and I want to see a video in which an animal is eating feedstuffs of A company," and provide the message to the first output device 300.

When such a situation occurs, the user will input another response message to the first output device 300, and the analysis unit 220 can re-search for a video or image matching the analyzed result, and output contents re-searched by the second output device 400.

According to an embodiment of the present invention, the content providing system using communication with animals can allow the user and the animal to receive and send messages including advertisement like they talk to each other, and provide customized contents to the animal by analyzing the messages by the server, thereby providing interesting and beneficial contents to the animal.

According to an embodiment of the present invention, the method for providing content using communication with animals can be implemented as a program (or application) to be executed by being combined with a computer which is hardware and can be stored in a medium included in the content providing system.

The program may include code coded as a computer language, such as C, C++, Java, machine language, etc. which a processor (CPU) of the computer can read through a device interface of a computer. The code may include a functional code associated with a function that defines necessary functions for executing the methods, and may include an execution procedure-related control code in which the processor of the computer needs to execute the functions according to predetermined procedures. In addition, the code may further include additional information necessary for the processor of the computer to execute the functions or memory reference-related code for whether the media should be referenced in which location (address) of the internal or external memory of the computer. Moreover, if communication with any other computer or server in a remote location is required to execute the functions by the process of the computer, the code may further include communication-related code for how to communicate with any other computer or server at a remote location using the communication module of the computer, or whether or not any information or media should be transmitted and received in the communication.

The medium to be stored refers not to a medium storing data for a short time but to a medium that stores data semi-permanently, like a register, cache, memory, and the like, and means a medium readable by a device. In detail, as examples of the medium to be stored, there are read-only memories (ROMs), random access memories (RAMs), CD-ROMs, magnetic tapes, floppy disks, optical data storage devices, and the likes, but the present invention is not limited thereto. That is, the program can be stored in various recording media on a variety of servers that can be accessed by a computer or various recording media on the user's computer. Furthermore, the media can store code that is distributed to a computer system connected to the network and that is readable by the computer in a distributed fashion.

The content providing program using communication with animals according to an embodiment of the present invention can allow the user and the animal to receive and send messages including advertisements in a manner of talking to each other, and provide customized contents to the animal by analyzing the messages by the server, thereby providing interesting and beneficial contents to the animal.

Hereinafter, the content providing method using communication with animals according to an embodiment of the present invention will be described. The following description is focused on differences between the content providing method using communication with animals and the content providing system and program using communication with animals, and undescribed parts are the same as the content providing system and program using communication with animals according to the embodiments of the present invention.

Figure 2:
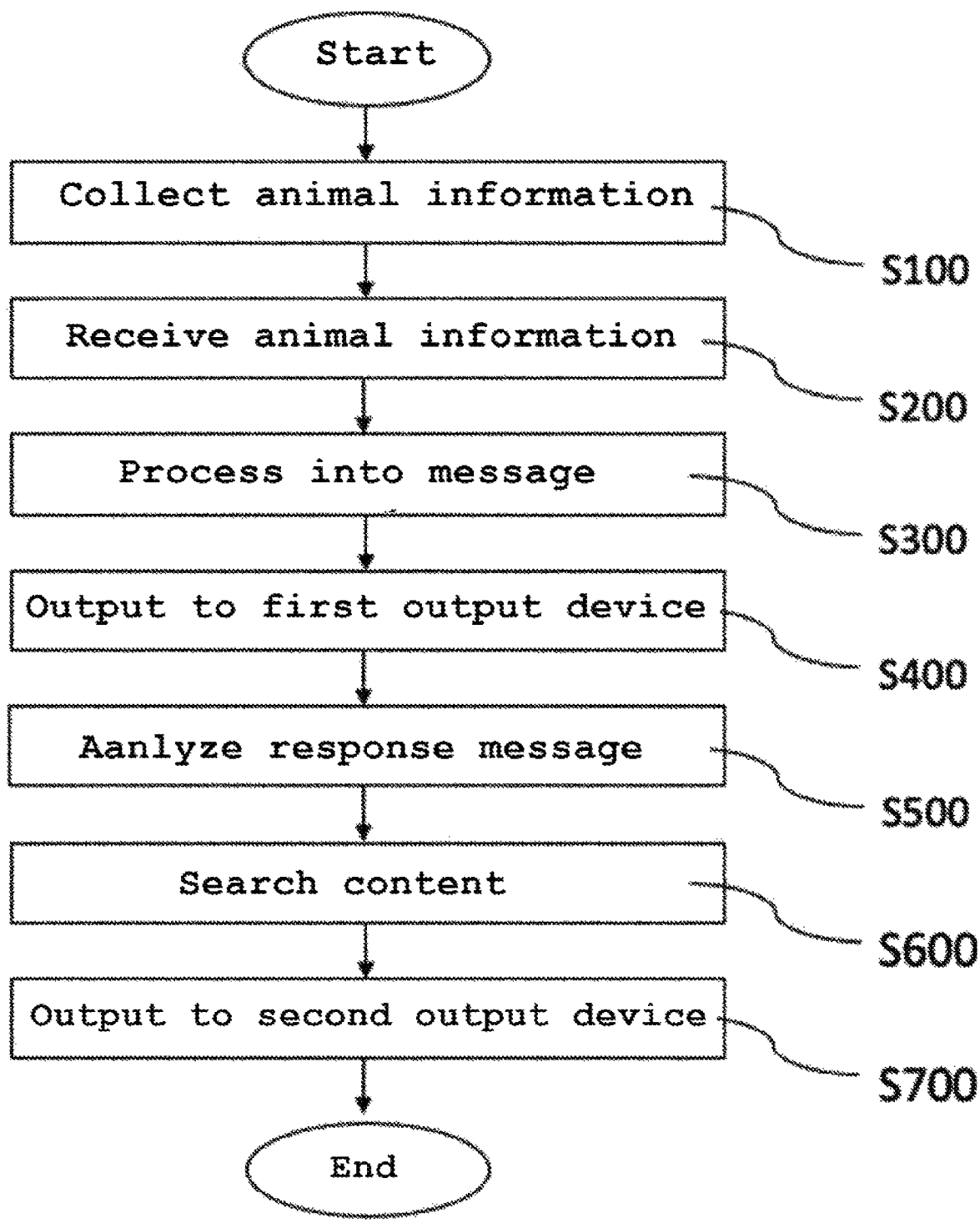
FIG. 2 is a schematic flow chart illustrating a method for providing content using communication with animals according to an embodiment of the present invention.

FIG. 2 is a schematic flow chart illustrating a method for providing content using communication with animals according to an embodiment of the present invention.

Referring to FIGS. 1 and 2, the content providing method using communication with animals according to an embodiment of the present invention includes an information collecting operation (S100), an information receiving operation (S200), a message processing operation (S300), a first outputting operation (S400), a response message analyzing operation (S500), a searching operation (S600), and a second outputting operation (S700).

The collecting device 100 collects information on an animal (S100). The information on the animal can include the animal's type, the animal's action, the animal's noises, and the animal's surrounding environment. The collecting device 100 may be, for instance, a camera.

The server 200 receives animal information received from the collecting device 100 (S200). In more detail, the collecting unit 210 receives animal information received from the collecting device 100.

The analysis unit 220 analyzes the received information and processes the analyzed information into a message (S300). The analysis unit 220 analyzes information, processes the analyzed information into a message, and provides the message to the first output device 300.

In an embodiment, the analysis unit 220 can analyze the information on the animal, and learn through deep learning to output a message corresponding to the information. When the information on the animal includes the animal's type, the animal's action, the animal's noises, and the animal's surrounding environment, the analysis unit 220 can learn each of the animal's type, the animal's action, the animal's noises, and the animal's surrounding environment through deep learning, and output a message corresponding to the information.

In an embodiment, the analysis unit 220 can analyze the information on the animal, and learn through a reinforcement learning model to output a message corresponding to the information. When the information on the animal includes the animal's type, the animal's action, the animal's noises, and the animal's surrounding environment, the analysis unit 220 can learn the animal's type, the animal's action, the animal's noises, and the animal's surrounding environment through one reinforcement learning model, but the present invention is not limited thereto.

The first output device 300 outputs a message (S400). The message can include advertisement. The first output device 300 can transfer the message to the user.

The first output device 300 can output a video or an audio recording.

The first output device 300 in an embodiment may be the user's smart device. The first output device 300 in an embodiment may be a wearable device that the animal wears. For instance, the first output device 300 may be a smart speaker attached to a leash of the animal.

The analysis unit 220 analyzes a response message received by the first output device 300 (S500). For instance, the analysis unit 220 can analyze the response message through the deep learning model or the reinforcement learning model. For example, the analysis unit 220 can produce search keywords searching for content for the search unit 230.

The search unit 230 searches for content corresponding to the analysis of the response message (S600). The search unit 230 can search whether or not there is matching content among images or videos stored in a database of the server 200, and determine whether or not there is matching content through Internet search.

The second output device 400 outputs the searched content (S700). The content may include an image or a video. The second output device 400 can provide the animal with the image or the video.

The second output device 400 may be a display device. The second output device 400 can be installed at a place in which the animal can watch the output contents.

The method for providing content using communication with animals and the program and the system therefor according to the present invention can analyze information of a pet, such as the pet's action, noise, and surrounding environment, process the information into a message, provide a user with the message, search for content matching the message after analyzing the user's response message, and provide the contents for the pet, thereby providing customized movies and images for the pet.

The above description of the present disclosure is just for illustration, and it will be understood by those skilled in the art that the invention may be embodied in other concrete forms without changing the technological scope and essential features. Therefore, the above-described embodiments should be considered only as examples in all aspects and not for purposes of limitation.

The invention claimed is:

1. A method for providing content using communication with animals, performed by a system including a camera, a server, a speaker and a display device, the method comprising:
   collecting, by the camera, information on an animal by capturing images of the animal and a surrounding environment of the animal;
   receiving, by the server, the information from the camera;
   analyzing and processing, by the server, the received information into a message;
   receiving, by the speaker attached to a leash of the animal, the message from the server, outputting, by the speaker attached to the leash of the animal, the message, and providing, by the speaker attached to the leash of the animal, a response message to the server;
   analyzing, by the server, the response message received from the speaker attached to the leash of the animal;
   searching, by the server, for an image content or a video content, which corresponds to the response message, in a database in the server;
   searching, by the server, for the image content or the video content, which corresponds to the response message, on Internet;
   outputting, by the display device positioned to show the content to the animal, the image content or the video content;
   collecting, by the camera, feedback information on the animal during or after the animal watches the image content or the video content;
   receiving, by the server, the feedback information, analyzing, by the server, the feedback information, processing, by the server, the feedback information into a feedback message indicating whether the animal was positive or negative to the image content or the video content, providing, by the server, the feedback message to the speaker attached to the leash of the animal, and analyzing, by the server, a feedback response message received from the speaker attached to the leash of the animal; and
   when feedback message indicates that the animal was negative to the image content or the video content, performing, by the server, an additional search for another image content or a video content, which corresponds to the feedback response message received from the speaker attached to the leash of the animal.

2. The method according to claim 1, wherein the information on the animal comprises information on a type, an action, noises, and the surrounding environment of the animal.

3. The method according to claim 1, wherein the message output from the speaker attached to the leash of the animal includes an advertisement.

4. The method according to claim 1, wherein the server analyzes the information on the animal, and learns through deep learning to output the message corresponding to the information.

5. The method according to claim 1, wherein the server analyzes the information on the animal, and learns through a reinforcement learning model to output the message corresponding to the information.

6. A non-transitory computer readable recording medium storing software that causes a system including a camera, a server, a speaker and a display device to perform:
collecting, by the camera, information on an animal by capturing images of the animal and a surrounding environment of the animal;
receiving, by the server, the information from the camera;
analyzing and processing, by the server, the received information into a message;
receiving, by the speaker attached to a leash of the animal, the message from the server, outputting, by the speaker attached to the leash of the animal, the message, and providing, by the speaker attached to the leash of the animal, a response message to the server;
analyzing, by the server, the response message received from the speaker attached to the leash of the animal;
searching, by the server, for an image content or a video content, which corresponds to the response message, in a database in the server;
searching, by the server, for the image content or the video content, which corresponds to the response message, on Internet;
outputting, by the display device positioned to show the content to the animal, the image content or the video content;
collecting, by the camera, feedback information on the animal during or after the animal watches the image content or the video content;
receiving, by the server, the feedback information, analyzing, by the server, the feedback information, processing, by the server, the feedback information into a feedback message indicating whether the animal was positive or negative to the image content or the video content, providing, by the server, the feedback message to the speaker attached to the leash of the animal, and analyzing, by the server, a feedback response message received from the speaker attached to the leash of the animal; and
when feedback message indicates that the animal was negative to the image content or the video content, performing, by the server, an additional search for another image content or a video content, which corresponds to the feedback response message received from the speaker attached to the leash of the animal.

7. A system for providing content using communication with animals, the system comprising:
a camera configured to collect information on an animal by capturing images of the animal and a surrounding environment of the animal;
a server configured to receive the information from the camera;
a speaker attached to a leash of the animal, and configured to receive a message corresponding to the information from the server, output the received message, and provide a response message; and
a display device positioned to show the content to the animal, and second output device configured to output the content corresponding to the response message,
wherein the server comprises:
a receiving unit configured to receive the information from the camera;
an analysis unit configured to analyze the information, process the information into the message, provide the message to the speaker attached to the leash of the animal, and analyze the response message received from the speaker attached to the leash of the animal; and
a search unit configured to perform a first search for an image content or a video content, which corresponds to the response message, in a database in the server, and a second search for the image content or the video content, which corresponds to the response message, on Internet,
wherein the display device is configured to output the image content or the video content,
wherein the camera is configured to collect feedback information on the animal during or after the animal watches the image content or the video content,
wherein the receiving unit of the server is configured to receive the feedback information,
wherein the analysis unit of the server is configured to analyze the feedback information, process the feedback information into a feedback message indicating whether the animal was positive or negative to the image content or the video content, provide the feedback message to the speaker attached to the leash of the animal, and analyze a feedback response message received from the speaker attached to the leash of the animal, and
wherein, when feedback message indicates that the animal was negative to the image content or the video content, the search unit of the server is configured to perform an additional search for another image content or a video content, which corresponds to the feedback response message received from the speaker attached to the leash of the animal.

8. The content providing system according to claim 7, wherein the information on the animal comprises information on a type, an action, noises, and the surrounding environment of the animal.

9. The content providing system according to claim 7, wherein the message output from the speaker attached to the leash of the animal includes an advertisement.

10. The content providing system according to claim 7, wherein the analyzing device analyzes the information on the animal, and learns through deep learning to output the message corresponding to the information.

11. The content providing system according to claim 7, wherein the analyzing device analyzes the information on the animal, and learns through a reinforcement learning model to output the message corresponding to the information.

* * * * *